Patented Mar. 11, 1941

2,234,581

UNITED STATES PATENT OFFICE 2,234,581

HYDROCARBON COMPOSITION CONTAINING ORGANIC BORON COMPOUNDS

Raphael Rosen, Elizabeth, N. J., assignor to Standard Oil Development Company, a corporation of Delaware No Drawing. Application September 30, 1937, Serial No. 166,621

8 Claims. (Cl. 252—51)

The present invention relates to improved oil compositions and more particularly to improved mineral lubricating oils and greases containing organic compounds of boron.

Oils used for the lubrication of internal combustion engines and for other services involving exposure to high temperatures and air or combustion gases are subjected to severe oxidizing conditions.

It is an object of this invention to improve lubricating compositions and mineral oil compositions generally by the addition thereto of organic compounds of boron. In such compounds, the boron element is joined directly to at least one carbon atom. Other and further objects of this invention will be apparent from the following description and the claims.

In these compounds boron is preferably attached directly to at least one carbon atom of a hydrocarbon radical, which radical contains hydrogen also attached to carbon but may in addition contain other elements such as nitrogen, oxygen, sulfur, chlorine, and the like, or in general may contain various non-metallic elements in addition to hydrogen and carbon.

As to the organic portion of the compounds, the simple alkyl hydrocarbon radicals may be used, such as ethyl, methyl, propyl, butyl, and the like, whether straight chained or branch chained, and these are satisfactory particularly at high temperatures, say 200° C., 250° C., and higher. The cyclic radicals such as phenyl, naphthyl, anthryl, are of much greater importance because they have a greater range of effectiveness both at low temperatures, 100° C. to 150° C., and high temperatures, from 200° C. to 250° C., and up. The alkylated aromatic radicals, of which tolyl, alpha and beta normal or isopropyl-naphthyl, primary or secondary hexyl-naphthyl or -anthryl compounds may be given as examples are especially desirable but the aryl substituted aliphatics such as diphenyl methane are also satisfactory. In some cases it is preferred to use the alkylated aromatic compounds to the unalkylated in order to obtain a greater solubility, although it must be appreciated that the substances of this class are ordinarily freely soluble in hydrocarbon oil and likewise that they are used in very minute quantities.

In these organic boron compounds all the organic radicals may be similar or they may be different, and one or more valences of boron may also be attached to hydrogen atoms.

Many organo boron compounds are readily oxidized in air, some even being spontaneously inflammable. This is especially true of the volatile, purely organo boron compounds, that is the compounds in which boron is connected only to hydrocarbon radicals. Of the purely organo borines, the aryl derivatives and especially those which are substantially involatile such as tri-a-naphthyl borine, are preferred for the purpose of this invention. This tendency of the organo borines to oxidize is greatly reduced when they are coordinated with a suitable compound such as ammonia or an amine or with ionic groups such as the OH ion or the fluoride ion. Examples of the resulting coordinated organo boron complexes are:

$(C_6H_5)_3B.OH.N(C_4H_9)_4$ tetrabutylammonium hydroxytriphenylboron.
$(C_6H_5)_3B.F.N(C_4H_9)_4$ tetrabutylammonium fluorotriphenylboron.
$(C_6H_5)_3B.NH_3$ triphenyl borine amine.
$(C_6H_5)_3B.C_2H_5NH_2$ triphenyl borine ethylamine.

These coordinated compounds of organo boron compounds are sufficiently oil-soluble in the low concentrations used and are preferred for the present purposes on account of their greater stability in air and greater ease in handling.

Boron compounds in which one or two of the valences are connected with elements other than carbon, as for example nitrogen, oxygen, sulfur, or halogen, are also much more stable with respect to oxidation in air than are the trialkyl and triaryl borines. The most familiar examples of compounds of this type are the amino alkyl and amino aryl boric acids. Other such compounds are diphenylboron chloride, phenylboron dichloride, diphenylboron sulfide $[(C_6H_5)_2B]_2S$, and the corresponding alkyl compounds. Also the alkyl and aryl boric acids, such as n-propyl boric acid, isobutyl boric acid, isoamyl boric acid, and phenyl boric acid may be used. However, the low solubility in hydrocarbon solvents of these compounds renders them less desirable for this use than the coordinated complexes mentioned above.

While the exact nature of these various compounds and the mechanisms by which they improve the lubricating oil are not particularly understood, it is observed that they appear to show in greater or less degree the property of decreasing the sludging tendency of the oil, which means that decomposition products formed under their influence, whatever their nature, are for the most part freely soluble or, at least, dispersible in the oil and that the tendency toward precipitation is thus greatly diminished.

No explanation of this behavior is presented and it should be noted that all show decrease in sludge forming tendency of oils which ordinarily produce a substantial quantity of sludge. It is not desired to infer from the above that sludge formation is the result of oxidation alone as is sometimes thought and it is specifically desired not to limit the present invention to any theory of the chemical action involved.

In the above description, several organo-boron compounds are mentioned and the suitable alkyl or aryl groups are also given. From this it will be clear that any combination of boron with any of the radicals of the organic groups are satisfactory for the present purposes.

The amounts of the agents which are used are in all cases minute, as much as .01 or .02% producing noticeable effects. It is generally desirable, however, to use 0.2% and it is rare that as much as .50% is required.

The substances mentioned above are effective in many different types of petroleum products, having boiling points above kerosene irrespective of the type or source, whether derived from paraffin or naphthenic or the various mixed base crudes and whether refined by acid, clay, solvent extraction, hydrogenation, destructive hydrogenation or otherwise, including the "white" oils refined to a high degree with strong or concentrated sulphuric acid. As noted above, one of the principal properties of these boron compounds is their efficacy in reducing tendency to sludging, but it will be realized that in no case is this tendency absolutely eliminated, and it is in many cases desirable to add substances of the class of sludge dispersing agents to the oil compositions containing the boron compounds.

The effectiveness of the organo-boron compounds in lubricating oils is indicated by the following example, which is presented only as an illustration of this invention and is not intended to limit it in any way:

Example 1

A blank sample of a well-refined lubricating oil, S. A. E. 50, was compared in a series of tests with a sample of the same oil to which was added 0.2% of triphenyl borine ethylamine. The results are indicated in the following table:

|  | Cone test | Oxidation rate |
|---|---|---|
| Unblended oil | 0.50 | 103—213—107 |
| Oil with 0.2% triphenyl borine ethylamine | 0.43 | 7—18—15—15 |

The oxidation rate was determined by continually circulating air through a 10 cc. sample of the oil at 200° C. and a constant rate and determining at 15-minute intervals the amount absorbed as cc. of oxygen.

The cone test which is found to best accord with ordinary operations represents the naphtha insoluble residue produced in 2 hours time when the oil is allowed to flow at a rate of 30 cc. per hour around a groove cut in an iron cone of standardized dimensions which is held at 250° C. The amount reported is in milligrams.

From the above table it will be seen that the addition agent improved the oil decidedly by reduction of the oxidation rate and by the cone test.

The present invention is not limited to any particular addition agents, nor to any theory of the effect of these substances, nor to the particular amounts but only to the following claims.

I claim:

1. A lubricant comprising in combination a major proportion of a hydrocarbon oil and a minor proportion of an organic boron compound, said compound containing at least one carbon-boron bond.

2. Composition of matter comprising a hydrocarbon oil containing in solution a minor proportion of an organo-boron compound of boron in which the boron is joined directly to a carbon atom of an organic group and also to an inorganic group of the class of Cl, OH, O and S.

3. Composition of matter comprising a hydrocarbon oil containing in solution a minor proportion of an organo-boron compound of boron in which the boron is joined directly to a carbon atom of an organic group, said compound also being coordinated with a nitrogen base.

4. A lubricant comprising in combination a major proportion of a viscous hydrocarbon oil and a minor proportion of triphenyl borine ethylamine.

5. A lubricant comprising in combination a major proportion of a hydrocarbon oil and a minor proportion of a tri-phenyl boron compound.

6. Composition according to claim 2 in which said hydrocarbon oil is a well-refined lubricating oil.

7. Composition of matter comprising in combination a major proportion of a hydrocarbon oil and a minor proportion of an organic boron compound, said compound containing at least one carbon-boron bond.

8. Composition of matter comprising a hydrocarbon oil containing in solution a minor proportion of a tri-aryl boron compound.

RAPHAEL ROSEN.